US009524556B2

(12) United States Patent
Uliyar et al.

(10) Patent No.: US 9,524,556 B2
(45) Date of Patent: Dec. 20, 2016

(54) METHOD, APPARATUS AND COMPUTER PROGRAM PRODUCT FOR DEPTH ESTIMATION

(71) Applicant: Nokia Corporation, Espoo (FI)

(72) Inventors: Mithun Uliyar, Bangalore (IN); Gururaj Gopal Putraya, Bangalore (IN); Soumik Ukil, Bangalore (IN); Basavaraja S V, Bangalore (IN); Krishna Annasagar Govindarao, Bangalore (IN); Veldandi Muninder, San Jose, CA (US)

(73) Assignee: Nokia Technologies Oy, Espoo (FI)

( * ) Notice: Subject to any disclaimer, the term of this patent is extended or adjusted under 35 U.S.C. 154(b) by 40 days.

(21) Appl. No.: 14/705,348

(22) Filed: May 6, 2015

(65) Prior Publication Data
US 2015/0339824 A1 Nov. 26, 2015

(30) Foreign Application Priority Data
May 20, 2014 (IN) .......................... 2516/CHE/2014

(51) Int. Cl.
*G06T 7/00* (2006.01)
*H04N 13/02* (2006.01)

(52) U.S. Cl.
CPC .......... *G06T 7/0055* (2013.01); *G06T 7/0065* (2013.01); *H04N 13/0214* (2013.01);
(Continued)

(58) Field of Classification Search
None
See application file for complete search history.

(56) References Cited

U.S. PATENT DOCUMENTS 8,027,531 B2   9/2011 Wilburn et al.
8,988,317 B1*  3/2015 Liang ...................... G06T 15/00
                                                  345/32

(Continued)

FOREIGN PATENT DOCUMENTS

CN          100592338 C      2/2010

OTHER PUBLICATIONS

Kowalczuk et al, "Light Field Assisted Stereo Matching using Depth from Focus and Image-Guided Cost-Volume Filtering," 2012, Proceedings of the International Conference on Image Processing, Computer Vision, and Pattern Recognition, pp. 1-6.*

(Continued)

*Primary Examiner* — David F Dunphy
(74) *Attorney, Agent, or Firm* — Nokia Technologies Oy

(57) ABSTRACT

In an example embodiment, a method, apparatus and computer program product are provided. The method includes computing a first cost volume for a light-field image. A first depth map comprising depth information of the plurality of sub-images of the light-field image is computed based on the first cost volume. A first view image comprising reconstruction information is reconstructed based on the depth information of the plurality of sub-images. A second cost volume corresponding to the first cost volume is computed based on the reconstruction information. The second cost volume is filtered based on the first view image to generate an aggregated cost volume. A second depth map is generated based on the aggregated cost volume. The second depth map facilitates generation of a second view image that is associated with a resolution higher than a resolution of the first view image.

20 Claims, 5 Drawing Sheets

(52) U.S. Cl.
CPC ..... *H04N 13/0232* (2013.01); *H04N 13/0271* (2013.01); *G06T 2200/21* (2013.01); *G06T 2207/10052* (2013.01); *G06T 2207/20228* (2013.01)

(56) References Cited

U.S. PATENT DOCUMENTS

| | | | |
|---|---|---|---|
| 9,294,662 B2* | 3/2016 | Vondran, Jr. | G06T 5/002 |
| 2012/0057040 A1* | 3/2012 | Park | H04N 5/2254 348/222.1 |
| 2014/0079336 A1* | 3/2014 | Venkataraman | G06T 5/005 382/275 |
| 2014/0152647 A1* | 6/2014 | Tao | G06T 7/0065 345/419 |
| 2014/0267243 A1* | 9/2014 | Venkataraman | G06T 7/0065 345/419 |
| 2014/0328535 A1* | 11/2014 | Sorkine-Hornung | G06T 5/00 382/154 |
| 2015/0193937 A1* | 7/2015 | Georgiev | G06T 7/0065 382/168 |
| 2015/0254868 A1* | 9/2015 | Srikanth | G06T 7/0081 348/47 |

OTHER PUBLICATIONS

Bishop et al, "Full-Resolution Depth Map Estimation from an Aliased Plenoptic Light Field," 2011, ACCV 2010, Part II, LNCS 6493, pp. 186-200.*

Wanner et al, "Variational Light Field Analysis for Disparity Estimation and Super-Resolution," 2014, IEEE Transactions on Pattern Analysis and Machine Intelligence, vol. 36, No. 3, pp. 606-619.*

Yu et al., "Plenoptic Depth Map In The Case Of Occlusions", Proceedings of the SPIE, vol. 8667, 2013, 9 pages.

Yang, "A Non-Local Cost Aggregation Method For Stereo Matching", IEEE Conference on Computer Vision and Pattern Recognition, Jun. 16-21, 2012, 8 pages.

Miei et al., "Segment-Tree Based Cost Aggregation For Stereo Matching", IEEE Conference on Computer Vision and Pattern Recognition, Jun. 23-28, 2013, pp. 313-320.

Uliyar et al., "Fast EPI Based Depth For Plenoptic Cameras", IEEE International Conference on Image Processing, Sep. 15-18, 2013, pp. 1-4.

Hirschmuller, "Stereo Processing By Semiglobal Matching and Mutual Information", IEEE Transactions on Pattern Analysis and Machine Intelligence, vol. 30, No. 2, Feb. 2008, pp. 1-14.

Baha et al., "Accurate Real-Time Disparity Map Computation Based On Variable Support Window", International Journal of Artificial Intelligence & Applications, vol. 2, No. 3, Jul. 2011, pp. 22-34.

Sabater et al., "Light-Field Demultiplexing And Disparity Estimation", HAL-00925652, Version 1, Jan. 8, 2014, 8 pages.

Extended European Search Report received for corresponding European Patent Application No. 15167064.3, dated Oct. 27, 2015, 5 pages.

Uliyar et al., "Pixel Resolution Plenoptic Disparity Using Cost Aggregation", International Conference on Image Processing, Oct. 27-30, 2014, pp. 3847-3851.

Kowalczuk et al., "Light Field Assisted Stereo Matching Using Depth From Focus And Image-Guided Cost-Volume Filtering", Proceedings of the 2012 International Conference on Image Processing, Computer Vision, and Pattern Recognition, 2012, 6 pages.

Hosni et al., "Fast Cost-Volume Filtering For Visual Correspondence And Beyond", IEEE Transactions on Pattern Analysis and Machine Intelligence, vol. 35, No. 2, Feb. 2013, pp. 504-511.

* cited by examiner

METHOD, APPARATUS AND COMPUTER PROGRAM PRODUCT FOR DEPTH ESTIMATION

TECHNICAL FIELD

Various implementations relate generally to method, apparatus, and computer program product for depth estimation.

BACKGROUND

Various electronic devices, for example, cameras, mobile phones, and other multimedia devices are widely used for capturing images of a scene. Some of these devices also feature a light-field camera that includes a micro-lens array in addition to a main lens to capture a three-dimensional (3D) light-field image of a scene. The light-field image can provide depth information of the scene which may be used in a multitude of applications such as image segmentation, image bokeh, and the like. For instance, the light-field image includes the depth information due to a presence of multiple copies of same scene point being casted under different micro-lenses associated with the micro-lens array. However, for existing depth estimation methods, light-field imaging is limited and provides coarse information for applications such as image segmentation, thereby affecting quality of a reconstructed image.

SUMMARY OF SOME EMBODIMENTS

Various aspects of example embodiments are set out in the claims.

In a first aspect, there is provided a method comprising: computing a first cost volume based on a cost matching between plurality of pixels associated with a plurality of sub-images of a light-field (LF) image for a plurality of disparity values; computing a first depth map based on the first cost volume, the first depth map comprising a depth information of the plurality of sub-images of the light-field image; reconstructing a first view image associated with the light-field image based on the depth information of the plurality of sub-images, the first view image comprising reconstruction information associated with the plurality of pixels; computing a second cost volume corresponding to the first cost volume based on the reconstruction information of the first view image; filtering the second cost volume based on the first view image to generate an aggregated cost volume; and generating a second depth map based on the aggregated cost volume, the second depth map facilitates generation of a second view image, wherein resolution of the second view image is higher than a resolution of the first view image.

In a second aspect, there is provided an apparatus comprising at least one processor; and at least one memory comprising computer program code, the at least one memory and the computer program code configured to, with the at least one processor, cause the apparatus to perform at least: compute a first cost volume based on a cost matching between plurality of pixels associated with a plurality of sub-images of a light-field image for a plurality of disparity values; compute a first depth map based on the first cost volume, the first depth map comprising a depth information of the plurality of sub-images of the light-field image; reconstruct a first view image associated with the light-field image based on the depth information of the plurality of sub-images, the first view image comprising reconstruction information associated with the plurality of pixels; compute a second cost volume corresponding to the first cost volume based on the reconstruction information of the first view image; filter the second cost volume based on the first view image to generate an aggregated cost volume; and generate a second depth map based on the aggregated cost volume, the second depth map configured to facilitate in generation of a second view image, wherein resolution of the second view image is higher than a resolution of the first view image.

In a third aspect, there is provided a computer program product comprising at least one computer-readable storage medium, the computer-readable storage medium comprising a set of instructions, which, when executed by one or more processors, cause an apparatus to perform at least: compute a first cost volume based on a cost matching between plurality of pixels associated with a plurality of sub-images of a light-field image for a plurality of disparity values; compute a first depth map based on the first cost volume, the first depth map comprising a depth information of the plurality of sub-images of the light-field image; reconstruct a first view image associated with the light-field image based on the depth information of the plurality of sub-images, the first view image comprising reconstruction information associated with the plurality of pixels; compute a second cost volume corresponding to the first cost volume based on the reconstruction information of the first view image; filter the second cost volume based on the first view image to generate an aggregated cost volume; and generate a second depth map based on the aggregated cost volume, the second depth map configured to facilitate in generation of a second view image, wherein resolution of the second view image is higher than a resolution of the first view image.

In a fourth aspect, there is provided an apparatus comprising: means for computing a first cost volume based on a cost matching between plurality of pixels associated with a plurality of sub-images of a light-field image for a plurality of disparity values; means for computing a first depth map based on the first cost volume, the first depth map comprising a depth information of the plurality of sub-images of the light-field image; means for reconstructing a first view image associated with the light-field image based on the depth information of the plurality of sub-images, the first view image comprising reconstruction information associated with the plurality of pixels; means for computing a second cost volume corresponding to the first cost volume based on the reconstruction information of the first view image; means for filtering the second cost volume based on the first view image to generate an aggregated cost volume; and means for generating a second depth map based on the aggregated cost volume, the second depth map configured to facilitate in generation of a second view image, wherein resolution of the second view image is higher than a resolution of the first view image.

In a fifth aspect, there is provided a computer program comprising program instructions which when executed by an apparatus, cause the apparatus to: compute a first cost volume based on a cost matching between plurality of pixels associated with a plurality of sub-images of a light-field image for a plurality of disparity values; compute a first depth map based on the first cost volume, the first depth map comprising a depth information of the plurality of sub-images of the light-field image; reconstruct a first view image associated with the light-field image based on the depth information of the plurality of sub-images, the first view image comprising reconstruction information associated with the plurality of pixels; compute a second cost volume corresponding to the first cost volume based on the reconstruction information of the first view image; filter the second cost volume based on the first view image to generate an aggregated cost volume; and generate a second depth map based on the aggregated cost volume, the second depth map configured to facilitate in generation of a second view image, wherein resolution of the second view image is higher than a resolution of the first view image.

BRIEF DESCRIPTION OF THE FIGURES

Various embodiments are illustrated by way of example, and not by way of limitation, in the figures of the accompanying drawings in which.

DETAILED DESCRIPTION

Example embodiments and their potential effects are understood by referring to FIGS. 1A through 7B of the drawings.

Figure 1A:
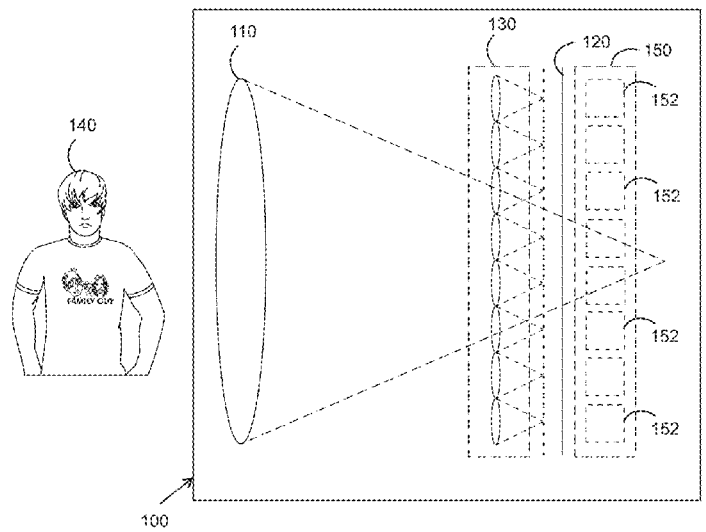
FIGS. 1A and 1B illustrate example representations of a light-field camera, in accordance with an example embodiment.
Figure 1B:
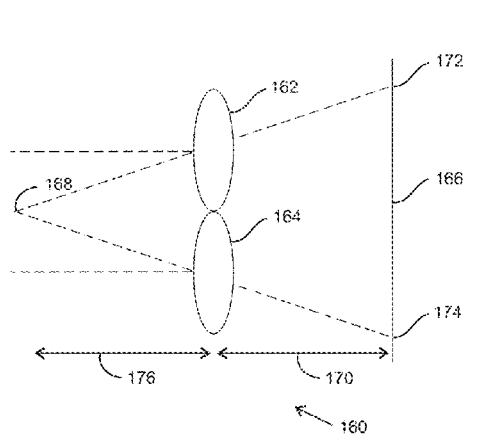

FIGS. 1A and 1B are example representations of a light-field camera 100. As illustrated in FIG. 1A, the light-field camera 100 includes a main lens 110, a sensor 120 and a micro-lens array 130 positioned between the main lens 110 and the sensor 120. Light is collected at the sensor 120 from various angles through the micro-lens array 130. In various scenarios, several images of portions of an object 140 (example of a scene) present in front of the light-field camera 100 are generated, by the micro-lens array 130, on the sensor 120. In an example, several micro-lenses of the micro-lens array 130 project a beam coming towards them from the main lens 110 onto different parts of the sensor 120, thereby creating multiple instances of an object point (belonging to the object 140) onto multiple locations of the sensor 120. For instance, the micro-lens array 130 is capable of generating a light-field image data 150 corresponding to the object 140. In an example embodiment, the light-field image data 150 may be stored in the memory, or any other storage locations embodied in an apparatus or otherwise accessible to the apparatus. It should be noted that the image data 150 includes a plurality of micro-images (for example, shown by 152), where each micro-image may include image information for at least a portion of the object 140. In various embodiments, the micro-image may be referred to as a sub-image, and accordingly the terms 'micro-image' and 'sub-image' may be used interchangeably throughout the description. The light-field image data 150 generated by the micro-lens array 130 is used to generate multiple view images of the scene comprising the object 140.

In an embodiment, a pixel location for a pixel point/scene point of the scene under different micro-lenses may be determined for computing a depth of a scene point or a pixel. An example expression for determining the depth of a scene point is explained with reference to FIG. 1B.

FIG. 1B illustrates an example configuration of a device 160, in accordance with an embodiment. It will be noted that the device 160 is an example of the device 100 (FIG. 1A). Also, it will be noted that only a portion of the device 100 is shown as the device 160 in FIG. 1B for simplifying the description of an example expression for determining the depth of a scene point.

In an embodiment, the device 160 may include an array of micro-lenses including, for example, a micro-lens 162 and a micro-lens 164 (similar to micro-lenses of the micro-lens array 130), and an image sensor 166 (similar to the sensor 120). The array of micro lenses are configured to create a map of light intensity for an object, for example, an object located at point 168, in the image at an image plane of the main lens. In an embodiment, the array of micro lenses may be configured at a distance (represented as 170) from the image sensor 166. In an embodiment, the image sensor 166 may be a charge-coupled device (CCD). In an embodiment, rays of light may be incident at the optical element, thereby generating one or more images, for example, images 172, 174 at an image plane and at a focal distance from the optical element. Micro-lenses may split a beam coming towards them, from the optical element, into rays. Herein, the rays may be assumed to be coming from different "pinhole" locations on an aperture of the optical element. The rays may be recorded as pixels on the image sensor 166, and the pixels under each micro-lens may collectively form an n-pixel image. The n-pixel region under each array of lens may be referred to as a micro-image. The light-field image captured by the device may generate a plurality of micro-images of a scene. An example light-field image is illustrated and described in FIG. 1C.

In an embodiment, a depth offset associated with the micro-lens may be computed based on the following expression:

$$P'=P+(1-(B/v))D \quad (1)$$

where,

D is a distance between adjacent micro-lenses, for example micro-lenses 162 and 164, p is the object point (shown as 168 in FIG. 1B) imaged by the main lens in front of the micro-lens, v is a distance (shown as 176 in FIG. 1B) between the imaged object point and the micro-lens array (comprising micro-lenses 162, 164). The imaged object point depends on the depth at which the point is present in front of the image capturing device. Hence, the distance 'v' depends on the depth of the scene, B is the distance (shown as 170 in FIG. 1B) between the micro-lens array and the image sensor 166, P is the pixel location (shown as 172 in FIG. 1B) where the object point 'p' is imaged for top micro-lens 162 (assuming pin-hole imaging), and P' is the pixel location (shown as 174 in FIG. 1B) where the object point 'p' is imaged for bottom micro-lens 164.

From equation (1), if the depth (that is, 'v') of the object point is known, then a corresponding pixel of the pixel location under different micro-lenses may be determined.

Figure 1C:
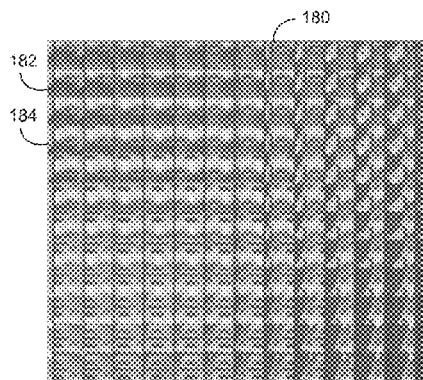
FIG. 1C represents a light-field image captured from a light-field camera, in accordance with an example embodiment.

Referring now to FIG. 1C, an example light-field image, for example the light-field image 180 is illustrated. As used herein, the terms 'light-field image' may refer to an infinite collection of vectors representative of light converging at a point from all possible angles in three dimension (3D). A light-field image is a complete representation of a visual scene and includes all possible views of the scene. The light-field image comprises angular information, for example, a four dimension (4D) information of light rays associated with the scene in 3D.

Figure 5:
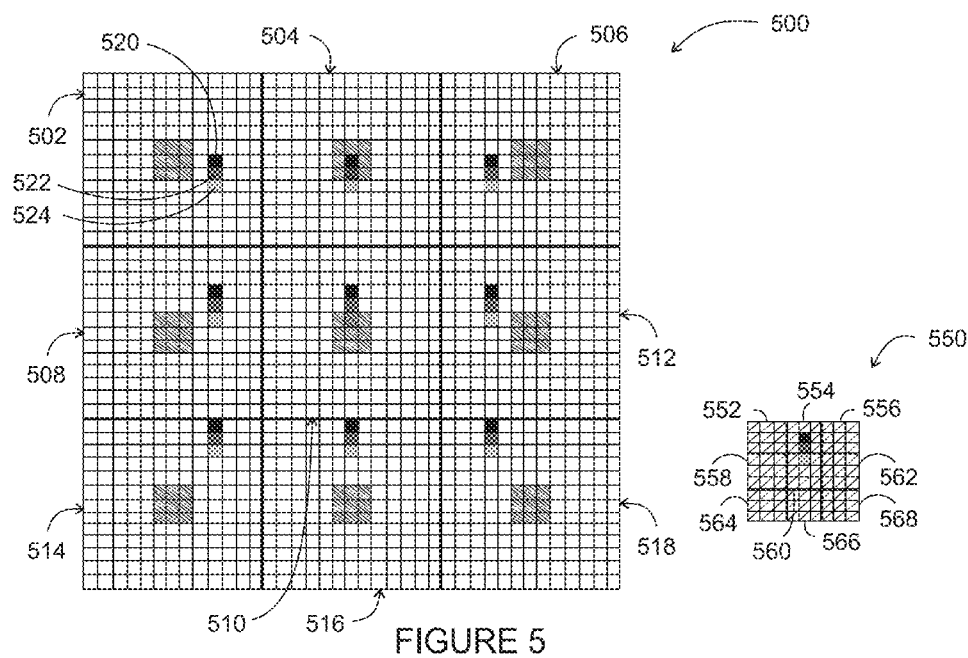
FIG. 5 illustrates an example representation of reconstruction of a view image from a light-field image, in accordance with an example embodiment.

As illustrated herein, the light-field image 180 includes a two dimension (2D) image that includes a plurality of small images, for example images 182, 184, and the like, associated with a scene. The plurality of small images may be termed as an array of "sub-images". In an embodiment, each of the sub-images associated with the scene may include depth information associated with the scene. In an embodiment, a device configured to capture the light-field image (for example, a light-field camera) may include an array of micro-lenses that enables the light-field camera to record not only image intensity, but also a distribution of intensity in different directions at each point. For generating an image from the light-field image, pixels from multiple sub-images may be selected. An example representation of combining multiple sub-images generated by the micro-lens array 130, to generate a view image, is shown in FIG. 5.

Figure 2:
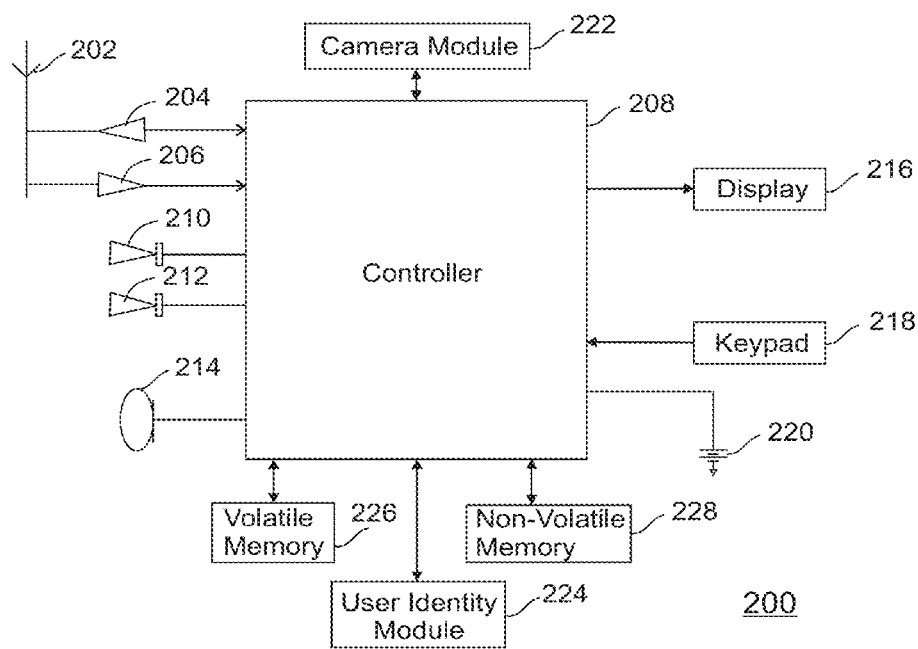
FIG. 2 illustrates a device, in accordance with an example embodiment.

FIG. 2 illustrates a device 200 in accordance with an example embodiment. It should be understood, however, that the device 200 as illustrated and hereinafter described is merely illustrative of one type of device that may benefit from various embodiments, therefore, should not be taken to limit the scope of the embodiments. As such, it should be appreciated that at least some of the components described below in connection with the device 200 may be optional and thus in an example embodiment may include more, less or different components than those described in connection with the example embodiment of FIG. 2. The device 200 could be any of a number of types of mobile electronic devices, for example, portable digital assistants (PDAs), pagers, mobile televisions, gaming devices, cellular phones, all types of computers (for example, laptops, mobile computers or desktops), cameras, audio/video players, radios, global positioning system (GPS) devices, media players, mobile digital assistants, or any combination of the aforementioned, and other types of communications devices.

The device 200 may include an antenna 202 (or multiple antennas) in operable communication with a transmitter 204 and a receiver 206. The device 200 may further include an apparatus, such as a controller 208 or other processing device that provides signals to and receives signals from the transmitter 204 and receiver 206, respectively. The signals may include signaling information in accordance with the air interface standard of the applicable cellular system, and/or may also include data corresponding to user speech, received data and/or user generated data. In this regard, the device 200 may be capable of operating with one or more air interface standards, communication protocols, modulation types, and access types. By way of illustration, the device 200 may be capable of operating in accordance with any of a number of first, second, third and/or fourth-generation communication protocols or the like. For example, the device 200 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA1000, wideband CDMA (WCDMA) and time division-synchronous CDMA (TD-SCDMA), with 3.9G wireless communication protocol such as evolved-universal terrestrial radio access network (E-UTRAN), with fourth-generation (4G) wireless communication protocols, or the like. As an alternative (or additionally), the device 200 may be capable of operating in accordance with non-cellular communication mechanisms. For example, computer networks such as the Internet, local area network, wide area networks, and the like; short range wireless communication networks such as include Bluetooth® networks, Zigbee® networks, Institute of Electric and Electronic Engineers (IEEE) 802.11x networks, and the like; wireline telecommunication networks such as public switched telephone network (PSTN).

The controller 208 may include circuitry implementing, among others, audio and logic functions of the device 200. For example, the controller 208 may include, but are not limited to, one or more digital signal processor devices, one or more microprocessor devices, one or more processor(s) with accompanying digital signal processor(s), one or more processor(s) without accompanying digital signal processor(s), one or more special-purpose computer chips, one or more field-programmable gate arrays (FPGAs), one or more controllers, one or more application-specific integrated circuits (ASICs), one or more computer(s), various analog to digital converters, digital to analog converters, and/or other support circuits. Control and signal processing functions of the device 200 are allocated between these devices according to their respective capabilities. The controller 208 thus may also include the functionality to convolutionally encode and interleave message and data prior to modulation and transmission. The controller 208 may additionally include an internal voice coder, and may include an internal data modem. Further, the controller 208 may include functionality to operate one or more software programs, which may be stored in a memory. For example, the controller 208 may be capable of operating a connectivity program, such as a conventional Web browser. The connectivity program may then allow the device 200 to transmit and receive Web content, such as location-based content and/or other web page content, according to a Wireless Application Protocol (WAP), Hypertext Transfer Protocol (HTTP) and/or the like. In an example embodiment, the controller 208 may be embodied as a multi-core processor such as a dual or quad core processor. However, any number of processors may be included in the controller 208.

The device 200 may also comprise a user interface including an output device such as a ringer 210, an earphone or speaker 212, a microphone 214, a display 216, and a user input interface, which may be coupled to the controller 208. The user input interface, which allows the device 200 to receive data, may include any of a number of devices allowing the device 200 to receive data, such as a keypad 218, a touch display, a microphone or other input device. In embodiments including the keypad 218, the keypad 218 may include numeric (0-9) and related keys (#, *), and other hard and soft keys used for operating the device 200. Alternatively or additionally, the keypad 218 may include a conventional QWERTY keypad arrangement. The keypad 218 may also include various soft keys with associated functions. In addition, or alternatively, the device 200 may include an interface device such as a joystick or other user input interface. The device 200 further includes a battery 220, such as a vibrating battery pack, for powering various circuits that are used to operate the device 200, as well as optionally providing mechanical vibration as a detectable output.

In an example embodiment, the device 200 includes a media capturing element, such as a camera, video and/or audio module, in communication with the controller 208. The media capturing element may be any means for capturing an image, video and/or audio for storage, display or transmission. In an example embodiment in which the media capturing element is a camera module 222, the camera module 222 may include a digital camera capable of forming a digital image file from a captured image. As such, the camera module 222 includes all hardware, such as a lens or other optical component(s), and software for creating a digital image file from a captured image. Alternatively, the camera module 222 may include the hardware needed to view an image, while a memory device of the device 200 stores instructions for execution by the controller 208 in the form of software to create a digital image file from a captured image. In an example embodiment, the camera module 222 may further include a processing element such as a co-processor, which assists the controller 208 in processing image data and an encoder and/or decoder for compressing and/or decompressing image data. The encoder and/or decoder may encode and/or decode according to a JPEG standard format or another like format. For video, the encoder and/or decoder may employ any of a plurality of standard formats such as, for example, standards associated with H.261, H.262/MPEG-2, H.263, H.264, H.264/MPEG-4, MPEG-4, and the like. In some cases, the camera module 222 may provide live image data to the display 216. Moreover, in an example embodiment, the display 216 may be located on one side of the device 200 and the camera module 222 may include a lens positioned on the opposite side of the device 200 with respect to the display 216 to enable the camera module 222 to capture images on one side of the device 200 and present a view of such images to the user positioned on the other side of the device 200.

The device 200 may further include a user identity module (UIM) 224. The UIM 224 may be a memory device having a processor built in. The UIM 224 may include, for example, a subscriber identity module (SIM), a universal integrated circuit card (UICC), a universal subscriber identity module (USIM), a removable user identity module (R-UIM), or any other smart card. The UIM 224 typically stores information elements related to a mobile subscriber. In addition to the UIM 224, the device 200 may be equipped with memory. For example, the device 200 may include volatile memory 226, such as volatile random access memory (RAM) including a cache area for the temporary storage of data. The device 200 may also include other non-volatile memory 228, which may be embedded and/or may be removable. The non-volatile memory 228 may additionally or alternatively comprise an electrically erasable programmable read only memory (EEPROM), flash memory, hard drive, or the like. The memories may store any number of pieces of information, and data, used by the device 200 to implement the functions of the device 200.

Figure 3:
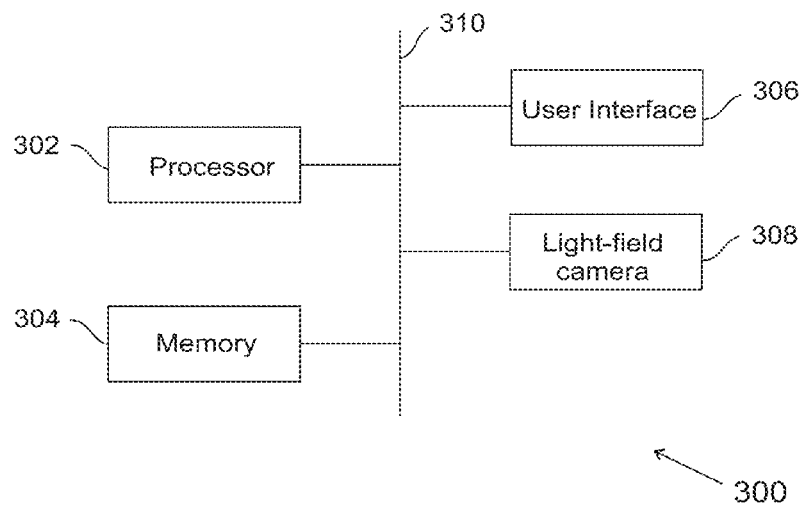
FIG. 3 illustrates an apparatus for depth estimation of a light-field image, in accordance with an example embodiment.

FIG. 3 illustrates an apparatus 300 for depth estimation for light-field images, in accordance with an example embodiment. The apparatus 300 may be employed, for example, in the device 100 of FIG. 1A. However, it should be noted that the apparatus 300, may also be employed on a variety of other devices both mobile and fixed, and therefore embodiments should not be limited to application on devices, such as the device 100 of FIG. 1A. Alternatively, embodiments may be employed on a combination of devices including, for example, those listed above. Accordingly, various embodiments may be embodied wholly at a single device, for example the device 100, or in a combination of devices. Furthermore, it should be noted that the devices or elements described below may not be mandatory and thus some may be omitted in certain embodiments.

The apparatus 300 includes or otherwise is in communication with at least one processor 302 and at least one memory 304. Examples of the at least one memory 304 include, but are not limited to, volatile and/or non-volatile memories. Some examples of the volatile memory include, but are not limited to, random access memory, dynamic random access memory, static random access memory, and the like. Some examples of the non-volatile memory include, but are not limited to, hard disks, magnetic tapes, optical disks, programmable read only memory, erasable programmable read only memory, electrically erasable programmable read only memory, flash memory, and the like. The memory 304 may be configured to store information, data, applications, instructions or the like for enabling the apparatus 300 to carry out various functions in accordance with various example embodiments. For example, the memory 304 may be configured to buffer input data comprising media content for processing by the processor 302. Additionally or alternatively, the memory 304 may be configured to store instructions for execution by the processor 302.

An example of the processor 302 may include the controller 208. The processor 302 may be embodied in a number of different ways. The processor 302 may be embodied as a multi-core processor, a single core processor; or combination of multi-core processors and single core processors. For example, the processor 302 may be embodied as one or more of various processing means such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an example embodiment, the multi-core processor may be configured to execute instructions stored in the memory 304 or otherwise accessible to the processor 302. Alternatively or additionally, the processor 302 may be configured to execute hard coded functionality. As such, whether configured by hardware or software methods, or by a combination thereof, the processor 302 may represent an entity, for example, physically embodied in circuitry, capable of performing operations according to various embodiments while configured accordingly. For example, if the processor 302 is embodied as two or more of an ASIC, FPGA or the like, the processor 302 may be specifically configured hardware for conducting the operations described herein. Alternatively, as another example, if the processor 302 is embodied as an executor of software instructions, the instructions may specifically configure the processor 302 to perform the algorithms and/or operations described herein when the instructions are executed. However, in some cases, the processor 302 may be a processor of a specific device, for example, a mobile terminal or network device adapted for employing embodiments by further configuration of the processor 302 by instructions for performing the algorithms and/or operations described herein. The processor 302 may include, among other things, a clock, an arithmetic logic unit (ALU) and logic gates configured to support operation of the processor 302.

A user interface 306 may be in communication with the processor 302. Examples of the user interface 306 include, but are not limited to, input interface and/or output interface. The input interface is configured to receive an indication of a user input. The output user interface provides an audible, visual, mechanical or other output and/or feedback to the user. Examples of the input interface may include, but are not limited to, a keyboard, a mouse, a joystick, a keypad, a touch screen, soft keys, and the like. Examples of the output interface may include, but are not limited to, a display such as light emitting diode display, thin-film transistor (TFT) display, liquid crystal displays, active-matrix organic light-emitting diode (AMOLED) display, a microphone, a speaker, ringers, vibrators, and the like. In an example embodiment, the user interface 306 may include, among other devices or elements, any or all of a speaker, a microphone, a display, and a keyboard, touch screen, or the like. In this regard, for example, the processor 302 may comprise user interface circuitry configured to control at least some functions of one or more elements of the user interface 306, such as, for example, a speaker, ringer, microphone, display, and/or the like. The processor 302 and/or user interface circuitry comprising the processor 302 may be configured to control one or more functions of one or more elements of the user interface 306 through computer program instructions, for example, software and/or firmware, stored on a memory, for example, the at least one memory 304, and/or the like, accessible to the processor 302.

In an example embodiment, the apparatus 300 may include an electronic device. Some examples of the electronic device include communication device, media capturing device with or without communication capabilities, computing devices, and the like. Some examples of the electronic device may include a mobile phone, a personal digital assistant (PDA), and the like. Some examples of computing device may include a laptop, a personal computer, and the like. In an example embodiment, the electronic device may include a user interface, for example, the user interface 306, having user interface circuitry and user interface software configured to facilitate a user to control at least one function of the electronic device through use of a display and further configured to respond to user inputs. In an example embodiment, the electronic device may include a display circuitry configured to display at least a portion of the user interface 306 of the electronic device. The display and display circuitry may be configured to facilitate the user to control at least one function of the electronic device.

In an example embodiment, the electronic device may be embodied as to include a transceiver. The transceiver may be any device operating or circuitry operating in accordance with software or otherwise embodied in hardware or a combination of hardware and software. For example, the processor 302 operating under software control, or the processor 302 embodied as an ASIC or FPGA specifically configured to perform the operations described herein, or a combination thereof, thereby configures the apparatus or circuitry to perform the functions of the transceiver. The transceiver may be configured to receive media content. Examples of the media content may include audio content, video content, data, and a combination thereof.

In an example embodiment, the electronic device may be embodied as to include a light-field camera 308. In various example embodiments, light-field camera 308 is capable of capturing the light coming from the scene such that multiple views of the scene can be generated from a single image. The light-field camera 308 may be in communication with the processor 302 and/or other components of the apparatus 300. The light-field camera 308 may be in communication with other imaging circuitries and/or software, and is configured to capture digital images or to make a video or other graphic media files. The light-field camera 308 and other circuitries, in combination, may be an example of at least one camera module such as the camera module 222 of the device 200. In an example embodiment, the light-field camera 308 may include a main lens, a sensor, and a plurality of micro-lenses placed between the main lens and the sensor. An example of the light-field camera is already explained with reference to FIG. 1A.

The components 302-308 may communicate to each other via a centralized circuit system 310, to facilitate depth estimation and image reconstruction in images captured by a light-field camera. The centralized circuit system 310 may be various devices configured to, among other things, provide or enable communication between the components 302-308 of the apparatus 300. In certain embodiments, the centralized circuit system 310 may be a central printed circuit board (PCB) such as a motherboard, main board, system board, or logic board. The centralized circuit system 310 may also, or alternatively, include other printed circuit assemblies (PCAs) or communication channel media.

In an example embodiment, the processor 302 is configured to, with the content of the memory 304, and optionally with other components described herein, to cause the apparatus 300 to facilitate receipt of a light-field image of a scene. In an example embodiment, the light-field image may be captured by a light-field camera (also termed as a plenoptic camera), such as the light-field camera 308. Herein, the 'scene' refers to arrangement (for example, natural, manmade, sorted or assorted) of one or more objects of which the images or videos can be captured, or of which the preview can be generated. In this example embodiment, the light-field image may be captured by the light-field camera that may be present in the apparatus 300. In another example embodiment, the apparatus 300 may be caused to send instructions for capturing of the light-field image of the scene by an external light-field camera that is accessible/communicably coupled to the apparatus 300. In some example embodiments, the light-field image may be prerecorded or stored in an apparatus 300, or may be received from sources external to the apparatus 300. In such example embodiments, the apparatus 300 is caused to receive the light-field image from external storage medium such as DVD, Compact Disk (C D), flash drive, memory card, or from external storage locations through Internet, Bluetooth®, and the like. In an example embodiment, a processing means may be configured to facilitate capture of the light-field image of the scene. An example of the processing means may include the processor 302, which may be an example of the controller 208, and/or the light-field camera 308.

In an example embodiment, the light-field image may include a plurality of sub-images. In an embodiment, the plurality of sub-images associated with the scene may include angular information associated with the scene. In an embodiment, a device configured to capture the light-field image (for example a light-field camera) may include an array of micro-lenses that enables the light-field camera to record not only image intensity, but also the distribution of intensity in different directions at each point. For generating an image, for example a view image from the light-field image, pixels from the sub-images may be selected. An example image (for example, a view image) being generated from a light-field image is illustrated with reference to FIG. 5.

In an example embodiment, for estimating depth associated with the light-field image, the processor 302 is configured to, with the content of the memory 304, and optionally with other components described herein, to cause the apparatus 300 to generate a coarse depth map to obtain an initial view image, and thereafter iteratively and hierarchically refine the initial view image so as to determine a pixel-level accurate depth. The pixel-level depth may be utilized for reconstructing a high resolution view image associated with the light-field image.

In an example embodiment, a coarse view image associated with the light-field image may be generated based on the coarse depth map associated with the light-field image. In an example, the coarse depth map associated with the light-field image may be a generated at a micro-lens (or sub-image) level. In an example embodiment, the coarse depth map may be generated from a cost volume, for example, a first cost volume associated with the light-field image.

In an example embodiment, the processor 302 is configured to, with the content of the memory 304, and optionally with other components described herein, to cause the apparatus 300 to compute the first cost volume associated with pixels of the light-field image for a plurality of disparity values. In an example embodiment, the first cost volume is a pixel-level cost volume for the light-field image. In an example embodiment, the first cost volume may include a set of matching costs for corresponding pixels of the neighboring sub-images, where matching costs may be determined for a plurality of disparity values. In this example embodiment, the cost volume may include a plurality of cost slices corresponding to 'd' number of matching costs for corresponding pixels of the sub-images calculated for 'd' number of disparity values. An example of the first cost volume is illustrated and explained with reference to FIG. 4.

In an example embodiment, a matching cost may refer to a degree of similarity (or distance) between two corresponding pixels in the sub-images, where the degree of similarity (or distance) may be measured in terms of intensity, color, or other image features.

In an example embodiment, the first cost volume may be computed using a multi-baseline approach on the raw light-field image. In an example embodiment, a plurality of pixels associated with the light-field image may include a data cost associated therewith. In an example embodiment, for each of the pixels in the raw light-field image, a pixel value may be computed. In an example embodiment, a cost for the pixels may be determined by computing an absolute difference between a pixel value for the pixel in the current sub-image and corresponding pixel in the neighboring sub-image. In an example embodiment, the cost for the plurality of pixels may be computed for a plurality of disparity values. For example, for every disparity value (for example, 1 to D), the corresponding pixels may be shifted by a disparity value dV in an appropriate direction by dV pixels, and an absolute difference may be computed between the pixel and the neighboring pixels. In an embodiment, the pixel values for the plurality of pixels computed for the plurality of disparity values may facilitate in generating the first cost volume having the plurality of slices corresponding to the plurality of disparity values (1 to D). For example, for a pixel p in the raw light-field image, the pixel-level cost volume value may be computed as:

$$DC_d = \sum_{q=1}^{n} |I_p - I_q|$$

where, d is the disparity value and ranges from 1 to a maximum disparity value, for example D, DC represents the first cost volume, q is the pixel in the neighboring sub-images (or micro-lenses) with which the current pixel p is compared, and n represents the number of neighboring sub-images (or micro-lenses) in which the pixel p is compared.

In an example embodiment, a processing means may include a means for computing the first cost volume. In this embodiment of computing the first cost volume, the means for computing the first cost volume may include means for computing, for the pixel of the plurality of pixels, the absolute difference between pixel values of the pixel in a current sub-image and the corresponding pixel in the neighboring sub-image for the plurality of disparity values to generate a plurality of slices of the cost volume. An example of the processing means may include the processor 302, which may be an example of the controller 208.

In an example embodiment, the processor 302 is configured to, with the content of the memory 304, and optionally with other components described herein, to cause the apparatus 300 to determine a first depth map based on the first cost volume. In an example embodiment, the first depth map may be a micro-lens level depth map, and may be generated from the pixel-level cost volume. In an example embodiment, the first depth map may be generated for the plurality of sub-images. For a sub-image of the plurality of sub-images, the first depth map may be computed by selecting a size for a support window corresponding to that sub-image. In an example embodiment, the apparatus 300 may be caused to select a support window at the center of the sub-image. In an example embodiment, for the support window, aggregated costs in matching planes corresponding to the plurality of disparity values may be computed. In an example embodiment, summed costs may be computed by aggregating matching costs of pixels in the support window. In an example embodiment, for a range of costs associated with a micro-lens corresponding to a plurality of disparity values, the disparity value associated with a minimum cost may be assigned to that micro-lens (or sub-image generated by the micro-lens). For example, from among the plurality of disparity values, a disparity value corresponding to a minimum aggregated cost may be assigned as the disparity value for the sub-image generated by the micro-lens. In an example embodiment, based on the disparity values associated with minimum costs associated with the plurality of micro-lenses of the light-field image, a depth map may be generated at the micro-lens level.

In an example embodiment, a processing means may include a means for computing the first depth map based on the first cost volume. In this embodiment of computing the first depth map, the means for computing the first depth map may include means for selecting a size for a support window corresponding to a sub-image of the plurality of sub-images. The means for computing the first depth map may also include means for computing aggregated costs by aggregating matching costs of pixels in the support window in the plurality of slices corresponding to the plurality of disparity values. In an embodiment, the means for computing the first depth map may also include means for assigning, from among the plurality of disparity values, the disparity value corresponding to a minimum aggregated cost as the disparity value for the sub-image. An example of the processing means may include the processor 302, which may be an example of the controller 208.

In an example embodiment, the processor 302 is configured to, with the content of the memory 304, and optionally with other components described herein, to cause the apparatus 300 to generate a first view image based on the micro-lens level depth map. In an example embodiment, the first view image may be utilized for performing cost aggregation based depth estimation. In an example embodiment, the first view image may be utilized as a view image for performing cost aggregation. In an example embodiment, the micro-lens level depth map may include multiple copies of pixels associated with various scene points.

In an example embodiment, the processor 302 is configured to, with the content of the memory 304, and optionally with other components described herein, to cause the apparatus 300 to, facilitate reconstruction of the first view image based on the copies of the scene point from the micro-lens level disparity map.

In an example embodiment, the first view image may be generated by selecting respective patches from the plurality of sub-images based on the disparity value associated with respective sub-image of the plurality of sub-images. In an embodiment, the patches associated with the plurality of sub-images may be concatenated to reconstruct the first view image. In an example embodiment, the size of the patches from the respective sub-image may be determined based on the disparity. An example representation of combining multiple sub-images generated by the micro-lens array to generate a view image, for example the first view image is shown in FIG. 5.

In an example embodiment, the first view image may include reconstruction information associated with the plurality of pixels of the light-field image. An example reconstruction information may be a mapping of pixel locations from the raw light-field image to the initial view image. The information of the mapping of pixel locations may hereinafter be referred to as pixel mapping information. In an example embodiment, the same pixel mapping information may be applied on the initial cost volume to obtain the second cost volume.

In an example embodiment, the processor 302 is configured to, with the content of the memory 304, and optionally with other components described herein, to cause the apparatus 300 to generate a second cost volume corresponding to the first cost volume based on the reconstruction information associated with the first reference image. In an embodiment, the second cost volume may include only those pixels which are used in building the first reference image. Herein, the first reference image may be treated as a reference image for generation of the second cost volume. In an example embodiment, for a plurality of patches in the first reference image, corresponding patches may be selected from all the slices of the first cost volume, to thereby generate the second cost volume. Herein, it will be understood that the second cost volume corresponds to the first reference image since the matching between the first cost volume and the first view image is a pixel-accurate matching.

In an example embodiment, the second cost volume may be utilized for depth estimation of the light-field image. In this example embodiment, a cost aggregation approach for filtering the second cost volume using the reconstructed light-field image (first view image) may be performed.

In an example embodiment, the processor 302 is configured to, with the content of the memory 304, and optionally with other components described herein, to cause the apparatus 300 to perform cost aggregation on the second cost volume to generate an aggregated cost volume. In an embodiment, the apparatus 300 may be caused to perform the cost aggregation based on the first view image to generate the aggregated cost volume. In an example embodiment, the processor 302 is configured to, with the content of the memory 304, and optionally with other components described herein, to cause the apparatus 300 to determine the aggregated cost volume based on a tree based aggregation method for example, a segment tree method or a minimum spanning tree (MST) method.

In the MST method, the reference image, for example the first view image, may be represented as a connected, undirected graph, with a weight function that may map edges to real-valued weights. In an example embodiment, the vertices of the graph are image pixels and the edges of the graph are the edges between the nearest neighboring pixels. The matching cost values are aggregated adaptively based on pixel similarity based on a MST derived from the graph. The similarity between any two vertices is decided by a shortest distance between the two vertices on the MST. In an example embodiment, a weight function may represent an image gradient operation between the nearest neighboring pixels. In an example embodiment, edges with large weights may be removed during spanning tree construction. As a result of MST method, a minimum spanning tree (MST) is generated which connects all the vertices such that the sum of its weights is minimum out of all spanning trees. In an example embodiment, MST is an accurate method for cost aggregation since every pixel in the reference image can correctly contribute to all the other pixels during cost aggregation.

In an example embodiment, the apparatus 300 is caused to aggregate the second cost volume based on the first view image to determine the aggregated cost volume. In an example embodiment, the apparatus is caused to aggregate the second cost volume based on the segment tree associated with the first view image to determine the aggregated cost volume. In an example embodiment, for the first view image, the aggregated costs are determined for each pixel (that is represented by node in the first segment tree) of the view image at each of the plurality of disparity values (d1, d2 . . . dn) to generate the aggregated cost volume. In an example embodiment, a processing means may be configured to determine the aggregated cost volume associated with the pixels of the first view image. An example of the processing means may include the processor 302, which may be an example of the controller 208.

In an example embodiment, the processor 302 is configured to, with the content of the memory 304, and optionally with other components described herein, to cause the apparatus 300 to, determine a second depth map based on the aggregated cost volume. In an example embodiment, a winner-take-all (WTA) approach may be applied to the aggregated cost volume to obtain the second depth map. In an example embodiment, based on the WTA method, a pixel level depth may be obtained. For example, a least matching cost for each pixel of the first view image may be determined from the aggregated cost volume based on the WTA optimization method used for depth map estimation.

In an example embodiment, the depth map being generated based on the WTA may be a smooth depth map as the depth map is aligned to the first view image. In an embodiment, the apparatus 300 may be caused to compare a measure of at least one quality parameter associated with the second reference image with a threshold measure. In an example embodiment, the at least one quality parameter associated with the second reference image may include parameters such as color, sharpness, and the like. In an example embodiment, if it is determined that the measure of the at least one quality parameter associated with the second reference image is lower than the threshold measure, the cost volume may be remapped using the pixel level depth being generated so as to improve the view image. In such scenarios, the second view image may be iteratively refined until the at least one quality parameter associated with the second view image is determined to be greater than or equal to the threshold parameter. In an example embodiment, the second view image may be iteratively refined by aggregating cost on second cost volume based on the second view image to re-compute the second cost volume, re-computing the second depth map based on the recomputed cost volume, and reconstructing the second view image based on the recomputed second depth map until the at least one quality parameter associated with the second reference image is determined to be greater than or equal to the threshold parameter. For example, as a measure of quality parameter, every new view image may be subtracted from the previous view image to generate an error residue. In an example embodiment, the summed residue should be less than a threshold value for the iteration to stop.

In certain scenarios, during depth estimation, a depth associated with a foreground portion of the image, also referred to as foreground depth may leak into a plain background portion of the image. Such a phenomenon where the foreground depth leaks into the background portion of the image may be referred to as a 'leaking phenomenon'. In various embodiments, the apparatus 300 may be caused to determine individual pixel values for the pixels associated with those background portions that may be compared with pixels of the foreground portions during the depth estimation. In an embodiment, the apparatus 300 may be caused to select a subset of pixel values from the disparity corresponding neighboring sub-image pixel values that may have values less than a threshold pixel value. The pixels corresponding to such pixel values only may be considered for the purpose of foreground depth estimation. In an embodiment, using the pixels having pixel values less than the threshold pixel value may facilitate in minimizing the influence of occluded pixels during depth transitions (for example, at contours or object edges in the images), thereby facilitating in removing the leaking effect of the foreground depth into the plain background. Further, the set of disparity values corresponding to the neighboring pixel values may be subtracted from the current pixel value for which cost needs to be computed. In an embodiment, a resulting absolute cost may then be sorted and a subset of the costs including least cost values may be chosen, thereby reducing the effect of the leaking phenomenon and problems created by occlusions.

Figure 4:
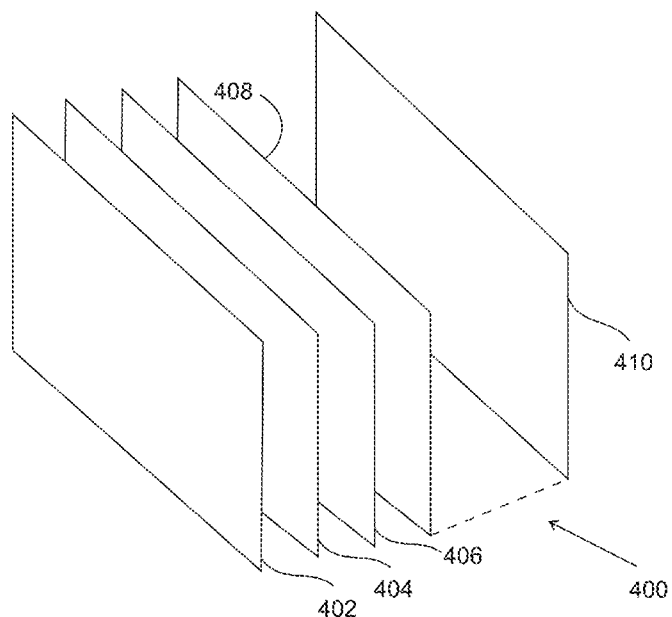
FIG. 4 illustrates an example representation of a cost volume, in accordance with an example embodiment.

FIG. 4 illustrates an example representation of a cost volume associated with a light-field image, for example the light-field image 180 (FIG. 1C), in accordance with an example embodiment. In an example embodiment, the light-field image may be associated with a scene. Herein, the 'scene' refers to an arrangement (natural, manmade, sorted or assorted) of one or more objects of which the images or videos can be captured, or of which the preview can be generated. In an example embodiment, the light-field image may include a plurality of sub-images of the scene captured by a device for example, by a light-field camera, a plenoptic camera, and the like. In an embodiment, the light-field image capturing devices effectively capture light intensity and angle of incidence on the same image sensor using an array of micro-lenses.

In an example embodiment, the plurality of sub-images captured by the plurality of micro-lenses may include a plurality of pixels. In an embodiment, for a pixel in a sub-image of the plurality of sub-images, the corresponding pixels in the neighboring sub-images may be treated as 'shifted pixels' in the neighboring sub-images. In an embodiment, a matching cost between the pixels of the sub-image and corresponding shifted pixels in the neighboring sub-images may be computed at a particular value of shift. In an embodiment, the 'shift' may be indicative of a disparity value. In an embodiment, the computation of the matching costs of the pixels and corresponding shifted pixels between the sub-image and the neighboring sub-images for a range of disparity values may facilitate in generation of a 3-D volume, known as a cost volume, for example the cost volume 400.

In an embodiment, the matching costs for the corresponding pixels of the sub-images and the neighboring sub-images may be computed based on methods such as sum of squared differences (SSD), sum of absolute differences (SAD), and the like. In an embodiment, the methods such as SSD and SAD include computing a pixel-wise squared difference or absolute differences of the sub-images and the neighboring sub-images. In an embodiment, for each target image of the plurality of target images, there may be a SAD/SSD map that may be equal to the size of the light-field image, and thus leads to the formation of the cost volume. As illustrated in FIG. 4, the cost volume 400 is shown to include a plurality of SAD/SSD maps (hereinafter, referred to as slices of the cost volume). The slices of the cost volume are represented by numerals 402, 404, 406, 408, and 410. In an embodiment, the cost volume 400 may be utilized for depth estimation of the light-field image. In an example embodiment, the cost volume 400 may be sampled at least once to facilitate in determination of the depth of the pixels of the light-field image. In an example embodiment, based on the determination of the depth associated with the plurality of pixels of the light-field image, a view image associated with the scene may be reconstructed. An example view image reconstructed from the depth map of the light-field image is described with reference to FIG. 5.

FIG. 5 illustrates an example representation of generation of a view image, for example a view image 550, from a light-field image, for example a light-field image 500, in accordance with an example embodiment. In an example embodiment, the light-field image 500 may be a portion of the light-field image 180 (FIG. 1C). Herein, the portion of the light-field image may be referred to as a light-field image 500, for the sake of brevity of description.

In an embodiment, the image portion 500 of a light-field image may include a plurality of sub-images such as sub-images (or micro-images) 502, 504, 506, 508, 510, 512, 514, 516 and 518 that may be arranged in a plurality of rows. For example, the sub-images 502, 504, and 506 may be arranged in a first row, the sub-images 508, 510, 512 in a second row and the sub-images 514, 516 and 518 in a third row. Each of the sub-images may include a plurality of object points associated with one or more objects of the image. The plurality of object points is represented by the plurality of boxes in FIG. 5. In the present example, the sub-images may include object points such as object points 520, 522, 524 in the sub-image 502. In this example representation, the plurality of sub-images such as the sub-images 502, 504, 506, 508, 510, 512, 514, 516 and 518 are shown as only including 16*16 pixels for the example purposes only. However, in various embodiments the plurality of sub-images may include more or lesser number of pixels.

In the present example, the object points 520, 522, 524 may be associated with distinct portions of an object in the image, and are thus depicted in different shades. The object points corresponding to the object points 520, 522, 524 may be casted under different micro-lenses and thus appear in different sub-images associated with the image portion 500. In other words, each of the micro-images 502, 504, 506, 508, 510, 512, 514, 516 and 518 may include copies of object points, such as object points 520, 522, 524. The object points corresponding to the object points 520, 522, 524 in the sub-images 504, 506, 508, 510, 512, 514, 516 and 518 are shown in same shade as that of the object points 520, 522, 524.

In an example embodiment, various object points associated with neighboring sub-images may be concatenated to generate a view image. In an embodiment, the object points utilized for the purpose of generation of the view image may be selected based on a matching cost associated with the disparity of the object points of the corresponding sub-images. In an example embodiment, patches may be selected from the plurality of micro-images based on the disparity values associated with the pixels/object points. For example, the patches selected for reconstructing the first row of the view image 550 may be selected from the sub-images 502, 504, and 506 of the first row based on the disparity value associated with the relative shift of pixels of the first row. In an embodiment, the patches that may be shifted by a value equal to the disparity value associated with a corresponding micro-lens (or sub-image). For example, based on the disparity associated with the first row, the patches may be selected for forming a portion of the first row of the reconstructed image. For example, if the disparity value between the sub-image 502 and the sub-image 504 is '×1' number of pixels, then while reconstructing the image, the patch may be selected from the sub-image 504 that is shifted by '×1' pixels from the center of the second sub-image. As illustrated in FIG. 5, the respective patches of the image 510 may be concatenated to generate the reconstructed image 550. For example, the respective patches 552, 554, 556, 558, 560, 562, 564, 566, and 568 may be concatenated to generate the reconstructed image 550.

In an embodiment, only three object points are considered herein for disparity determination, for the purpose of brevity of description. However, it will be noted that the same description is true for any other number of object points also.

In an example embodiment, the view image 550 may be utilized as a reference image for depth estimation of the light-field image. Some example embodiments of depth estimation for the light-field images captured or otherwise accessible by the apparatus 300 are further described with reference to FIGS. 6 and 7A, 7B.

Figure 6:
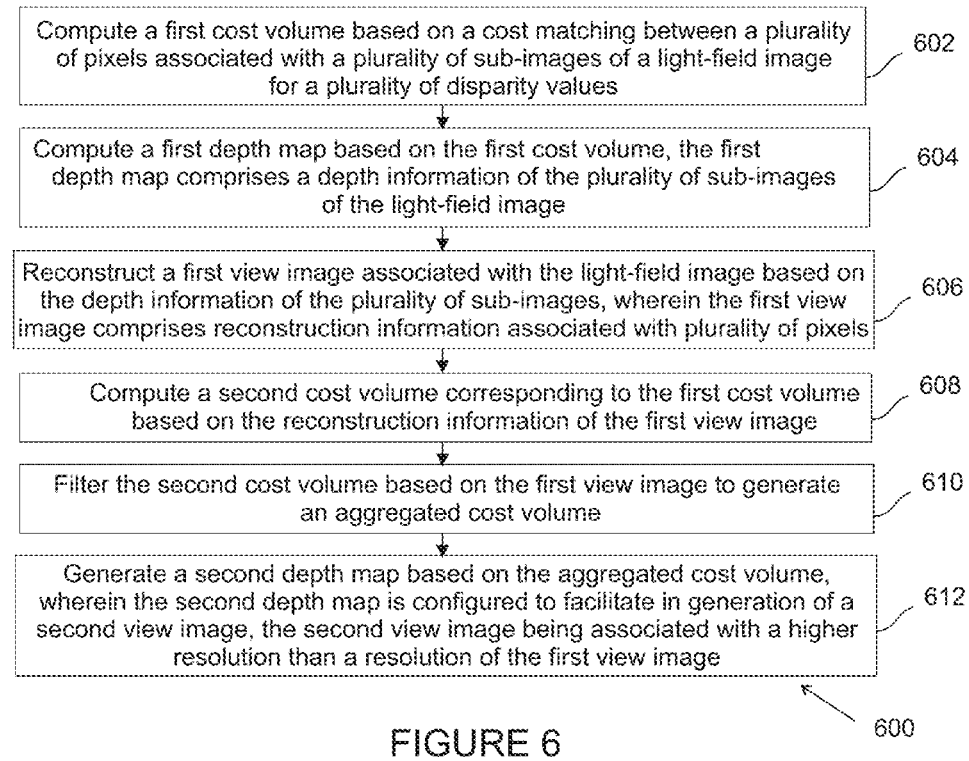
FIG. 6 is a flowchart depicting an example representation for depth estimation of a light-field image, in accordance with an example embodiment.

FIG. 6 is a flowchart depicting an example method 600, in accordance with an example embodiment. Example references of the FIGS. 1A to 5 may be made for the description of the method 600. The method 600 depicted in the flowchart may be executed by, for example, the apparatus 300 of FIG. 3.

In an example embodiment, the method facilitates in estimating depth associated with a light-field image by generating a coarse reference image to perform an initial depth estimation, and thereafter iteratively and hierarchically refining the coarse reference image so as to determine a pixel-level accurate depth. The pixel-level depth may be utilized for reconstructing a high resolution reference image associated with the light-field image.

At 602, the method 600 includes computing, for a plurality of disparity values, a first cost volume based on a cost matching between a plurality of pixels associated with a plurality of sub-images of a light-field image. In an example embodiment, the first cost volume may include a set of matching costs for corresponding pixels of the neighboring sub-images, where matching costs may be determined for a plurality of disparity values. In this example embodiment, the cost volume may include a plurality of cost slices corresponding to matching costs for corresponding pixels of the sub-images calculated for 'd' number of disparity values. An example of the first cost volume is explained with reference to FIG. 4.

At 604, a first depth map may be computed based on the first cost volume. A depth map may be considered to represent the values related to the distance of the surfaces of the scene objects from a reference location, for example a view point of an observer. The depth map is an image that may include depth information of the plurality of sub-images or any similar information. For example, each sample in a depth map represents the distance of the respective texture sample or samples from the plane on which the camera lies. In other words, if the z axis is along the shooting axis of the cameras (and hence orthogonal to the plane on which the cameras lie), a sample in a depth map represents the value on the z axis.

In an embodiment, the first depth map may be computed based on a cost aggregation method. For example, a size for a support window corresponding to a sub-image of the plurality of sub-images may be selected, and for the support window, aggregated costs in matching planes/cost volume slice corresponding to the plurality of disparity values may be computed.

At 606, a first view image associated with the light-field image may be reconstructed. In an embodiment, the first view image may be generated based on the depth information of the plurality of sub-images. In an embodiment, the first view image may include reconstruction information associated with the plurality of pixels. At 608, a second cost volume may be computed corresponding to the first cost volume based on the reconstruction information of the first reference image. In an embodiment, the second cost volume may include only those pixels which are used in building the first view image. Herein, the view image may be treated as a reference image for generation of the second cost volume. In an example embodiment, for a plurality of patches in the first view image, corresponding patches may be selected from all the slices of the first cost volume, to thereby generate the second cost volume.

At 610, the second cost volume may be filtered based on the first view image to generate an aggregated cost volume. In an embodiment, filtering the first cost volume may include performing the cost aggregation of the second cost volume based on the first view image to generate the aggregated cost volume. In an example embodiment, the aggregated cost volume may be determined based on a tree based aggregation method for example, a segment tree method or a minimum spanning tree (MST) method. At 612, a second depth map may be generated based on the aggregated cost volume. In an embodiment, the second depth map may facilitate in generation of a second view image. In an embodiment, resolution of the second view image may be higher than a resolution of the first view image.

It will be noted herein that the method 600 facilitates in determining depth for individual view images separately. As such, for different view images, the depth may be determined without an additional cost. The initial cost volume, for example the first cost volume may be utilized for performing depth estimation for different view images.

FIG. 7 is a flowchart depicting an example method 700 for depth estimation in light-field images, in accordance with another example embodiment. Example references are made to FIGS. 1A to 5 for the description of the method 700. The method 700 depicted in the flowchart may be executed by, for example, the apparatus 300 of FIG. 3.

As explained earlier, the term light-field image' may refer to an infinite collection of vectors representative of the light converging at a point from all possible angles in three dimension (3D). A light-field image is a complete representation of a visual scene and contains all possible views of the scene. An example light-field camera arrangement and a light-field image are explained with reference to FIGS. 1A, 1B and 1C.

In an example embodiment, the light-field image of a scene includes a plurality of sub-images such that the plurality of sub-images includes angular information associated with the scene. In an embodiment, a device configured to capture the light-field image (for example a light-field camera) may include an array of micro-lenses that enables the light-field camera to record not only image intensity, but also the distribution of intensity in different directions at each point. For generating a view image from the light-field image, pixels and/or patches of pixels from the sub-images may be selected and concatenated to generate the view image of the scene. Various embodiments discloses a method 700 for an accurate depth estimation associated with the light-field image, and generation of a high-intensity view image based on the estimated depth.

At 702, the method 700 includes facilitating receipt of a light-field image of a scene by a light-field camera. In an example embodiment, the light-field image may include a plurality of sub-images casted under a plurality of micro-lenses of the light-field camera. In an example embodiment, the plurality of sub-images may include copies of various scene points (for example, pixels). In an example embodiment, the plurality of pixels of the light-field image may be associated with a corresponding matching cost that is indicative of similarity of the respective pixel with neighboring pixels and/or pixels associated with the other sub-images.

At 704, a first cost volume for the light-field image may be computed based on a matching cost between corresponding pixels of neighboring sub-images for a plurality of disparity values. In an example embodiment, the first cost volume may include a plurality of slices. In an embodiment, a slice of the plurality of slices of the first cost volume may be determined by computing, for a pixel of the plurality of pixels in a current sub-image, an absolute difference between pixel values of the pixel in the current sub-image and pixel value of a corresponding pixel in a neighboring sub-image. In an embodiment, the plurality of slices of the first cost volume may be generated by determining the plurality of slices corresponding to the plurality of disparity values. In an example embodiment, the first cost volume is a pixel-level cost volume for the light-field image. An example first cost volume is illustrated and explained with reference to FIG. 4.

At 706, a first depth map is computed based on the first cost volume. In an example embodiment, the first depth map may be computed based on a multi-baseline method. An example depth map computation method is explained with reference to 708, 710 and 712. For example, at 708, a size for a support window corresponding to a sub-image of the plurality of sub-images may be selected. In an example embodiment, the size of the support window may be selected based on gradients of intensities associated with channels of multiple pixels around the pixels. At 710, aggregated costs in the plurality of slices associated with the plurality of disparity values may be computed. In an example embodiment, the summed cost may be computed by aggregating matching costs of pixels in the support window. At 712, from among the plurality of disparity values corresponding to the sub-images, a disparity value corresponding to a minimum summed cost may be assigned as the disparity value for the sub-image. In an example embodiment, the first depth map may be indicative of depths corresponding to the plurality of micro-lenses of the light-field image, and may be referred to as 'micro-lens level depth map'. In an example embodiment, the depth may include depth information associated with the plurality of sub-images.

At 714, a first view image associated with the light-field image may be reconstructed based on the depth information. For example, at 716, respective patches from the plurality of sub-images may be selected based on the disparity values associated with respective sub-image of the plurality of sub-images. At 718, the respective patches associated with the plurality of sub-images may be concatenated to reconstruct the first view image. In an example embodiment, the size of the patches from the respective sub-image may be determined based on the disparity. In an example embodiment, the first view image may be utilized as a reference image for performing cost aggregation and further depth estimation. The reconstruction of the first view image is already explained with reference to FIG. 5.

In an embodiment, a second cost volume corresponding to the first cost volume may be computed based on the reconstruction information of the first view image. In an example embodiment, the second cost volume may be computed by selecting corresponding patches for the plurality of patches in the first view image, from a plurality of slices of the first cost volume to generate a second cost volume, at 720.

The second cost volume may be filtered based at least on the first view image to generate an aggregated cost volume. In an example embodiment, the second cost volume may be filtered by performing cost aggregation on the second cost volume based on tree-based aggregation to determine the aggregated cost volume, at 722. At 724, a second depth map may be computed based on the aggregated cost volume. In an example embodiment, the second depth map may be computed by selecting disparity values associated with the pixels based on winner-take-all (WTA) approach.

At 726, a second view image may be reconstructed based on the second depth map. In an example embodiment, the second view image reconstructed based on the second depth map may be associated with a higher resolution than the resolution of the first reference image. At 728, a measure of at least one quality parameter associated with the second view image may be determined. In an example embodiment, at least one quality parameter may include resolution parameter, color parameter, and the like. At 730, it may be determined whether or not the measure of the at least one quality parameter is greater than or equal to a threshold measure. In an example embodiment, if the measure of the at least one quality parameter is determined to be greater than or equal to the threshold measure, the second view image may be output as a high-resolution image associated with the light-field image, at 732. If, however, the measure of the at least one quality parameter is not determined to be lower than the threshold measure, cost aggregation may be performed on the second cost volume based on the second view image to re-compute the second cost volume, at 734. In an embodiment, the re-generation of the second depth map may further facilitate in again reconstructing the second view image based on the re-generated second depth map. In an embodiment, the re-generation of the second depth map followed by reconstructing the second reference image may be iteratively repeated until the measure of the at least one quality parameter associated with the reconstructed image (for example, the second view image) is determined to be greater than or equal to the threshold measure.

Figure 7A:
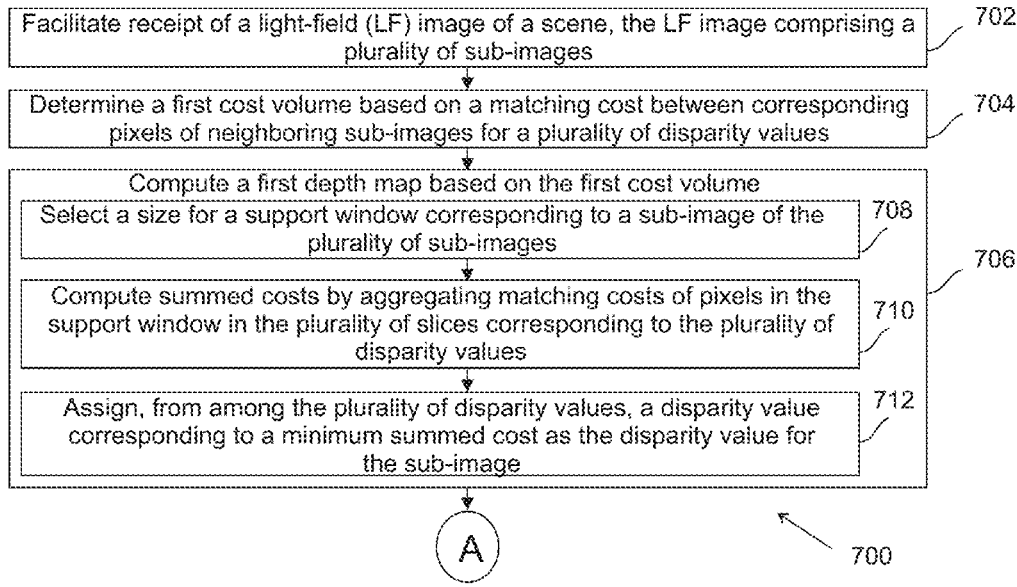
FIGS. 7A and 7B is a flowchart depicting an example method for depth estimation of a light-field image, in accordance with another example embodiment.
Figure 7B:
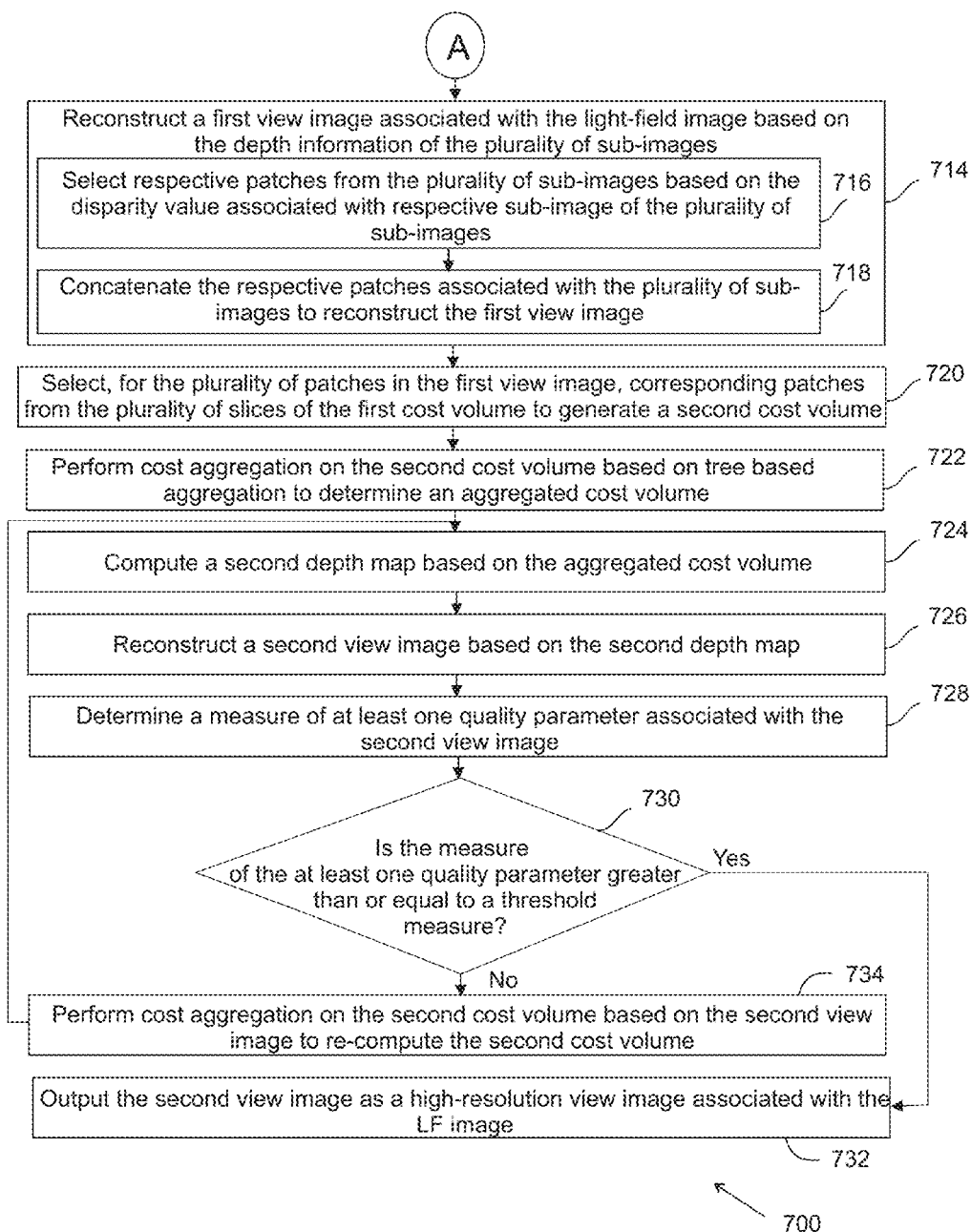

It should be noted that to facilitate discussions of the flowcharts of FIGS. 6 to 7B, certain operations are described herein as constituting distinct steps performed in a certain order. Such implementations are examples only and non-limiting in scope. Certain operation may be grouped together and performed in a single operation, and certain operations can be performed in an order that differs from the order employed in the examples set forth herein. Moreover, certain operations of the methods 600 and 700 are performed in an automated fashion. These operations involve substantially no interaction with the user. Other operations of the methods 600 and 700 may be performed by in a manual fashion or semi-automatic fashion. These operations involve interaction with the user via one or more user interface presentations.

The methods depicted in these flow charts may be executed by, for example, the apparatus 300 of FIG. 3. Operations of the flowchart, and combinations of operation in the flowcharts, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of an apparatus and executed by at least one processor in the apparatus. Any such computer program instructions may be loaded onto a computer or other programmable apparatus (for example, hardware) to produce a machine, such that the resulting computer or other programmable apparatus embody means for implementing the operations specified in the flowchart. These computer program instructions may also be stored in a computer-readable storage memory (as opposed to a transmission medium such as a carrier wave or electromagnetic signal) that may direct a computer or other programmable apparatus to function in a particular manner, such that the instructions stored in the computer-readable memory produce an article of manufacture the execution of which implements the operations specified in the flowchart. The computer program instructions may also be loaded onto a computer or other programmable apparatus to cause a series of operations to be performed on the computer or other programmable apparatus to produce a non-transitory computer-implemented process such that the instructions, which execute on the computer or other programmable apparatus, provide operations for implementing the operations in the flowchart. The operations of the methods are described with help of apparatus 300. However, the operations of the methods can be described and/or practiced by using any other apparatus.

Without in any way limiting the scope, interpretation, or application of the claims appearing below, a technical effect of one or more of the example embodiments disclosed herein is to provide methods and apparatus for depth estimation in light-field images. In an example embodiment, for estimating depth associated with the light-field image, a coarse view image is generated and utilized for performing an initial depth estimation. Thereafter iteratively and hierarchically the coarse reference image is refined so as to estimate a pixel-level accurate depth. The pixel-level depth may be utilized for reconstructing a high resolution reference image associated with the light-field image. The disclosed method facilitates in estimating depth for individual views associated with the light-field image separately, and thus when the view image is created, the depth is estimated without much of an additional cost. An initial cost volume, for example the first cost volume remains same for the different view images. The pixel-level depth estimated herein for the reconstructed view image can be used for the purpose of various applications such as image bokeh, image segmentation, and the like.

Various embodiments described above may be implemented in software, hardware, application logic or a combination of software, hardware and application logic. The software, application logic and/or hardware may reside on at least one memory, at least one processor, an apparatus or, a computer program product. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of an apparatus described and depicted in FIGS. 2 and/or 3. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present disclosure as defined in the appended claims.

What is claimed is:

1. A method comprising:
   computing, for a plurality of disparity values, a first cost volume based on a cost matching between a plurality of pixels associated with a plurality of sub-images of a light-field image;
   computing a first depth map based on the first cost volume, the first depth map comprising a depth information of the plurality of sub-images of the light-field image;
   reconstructing a first view image associated with the light-field image based on the depth information of the plurality of sub-images, the first view image comprising reconstruction information associated with the plurality of pixels;
   computing a second cost volume corresponding to the first cost volume based on the reconstruction information of the first view image;
   filtering the second cost volume based on the first view image to generate an aggregated cost volume; and
   generating a second depth map based on the aggregated cost volume, the second depth map configured to facilitate in generation of a second view image, wherein resolution of the second view image is higher than a resolution of the first view image.

2. The method as claimed in claim 1, wherein computing the first cost volume comprises:
   computing, for a pixel of the plurality of pixels in a current sub-image, an absolute difference between pixel value of the pixel in the current sub-image and pixel value of a corresponding pixel in a neighboring sub-image; and generating, for a disparity value of the plurality of disparity values, a slice of a plurality of slices of the first cost volume based on the cost matching.

3. The method as claimed in claim 2, wherein computing the first depth map comprises:

selecting a size for a support window corresponding to a sub-image of the plurality of sub-images;

computing summed costs by aggregating matching costs of pixels in the support window in the plurality of slices corresponding to the plurality of disparity values; and assigning, from among the plurality of disparity values, a disparity value corresponding to a minimum summed cost as the disparity value for the sub-image.

4. The method as claimed in claim 3, wherein reconstructing the first view image comprises:

selecting, from the plurality of sub-images, respective patches based on the disparity value associated with respective sub-images of the plurality of sub-images; and concatenating the respective patches associated with the plurality of sub-images to reconstruct the first view image.

5. The method as claimed in claim 4, wherein computing the second cost volume comprises selecting, for the respective patches in the first view image, corresponding patches from the plurality of slices of the first cost volume.

6. The method as claimed in claim 1, wherein filtering the second cost volume comprises:

performing cost aggregation on the second cost volume based on tree-based aggregation.

7. The method as claimed in claim 1, further comprising:

comparing a measure of at least one quality parameter associated with the second reference image with a threshold measure; and performing iteratively, upon determination of the measure of the at least one quality parameter being lower than the threshold measure:

performing cost aggregation on the second cost volume based on the second view image to re-compute the second cost volume, re-computing the second depth map based on the re-computed second cost volume, and reconstructing the second reference image based on the recomputed second depth map.

8. The method as claimed in claim 1, further comprising facilitating receipt of the light-field image of a scene.

9. An apparatus comprising:
at least one processor; and
at least one memory comprising computer program code, the at least one memory and the computer program code configured to, with the at least one processor, cause the apparatus to at least perform:

compute, for a plurality of disparity values, a first cost volume based on a cost matching between plurality of pixels associated with a plurality of sub-images of a light-field image;

compute a first depth map based on the first cost volume, the first depth map comprising a depth information of the plurality of sub-images of the light-field image;

reconstruct a first view image associated with the light-field image based on the depth information of the plurality of sub-images, the first view image comprising reconstruction information associated with the plurality of pixels;

compute a second cost volume corresponding to the first cost volume based on the reconstruction information of the first view image;

filter the second cost volume based on the first view image to generate an aggregated cost volume; and generate a second depth map based on the aggregated cost volume, the second depth map configured to facilitate in generation of a second view image, wherein resolution of the second view image is higher than a resolution of the first view image.

10. The apparatus as claimed in claim 9, wherein to compute the first cost volume, the apparatus is caused at least in parts to:

compute, for a pixel of the plurality of pixels in a current sub-image, an absolute difference between pixel value of the pixel in the current sub-image and pixel value of a corresponding pixel in a neighboring sub-image; and generate, for a disparity value of the plurality of disparity values, a slice of a plurality of slices of the first cost volume based on the cost matching.

11. The apparatus as claimed in claim 10, wherein to compute the first depth map, the apparatus is further caused, at least in part to:

select a size for a support window corresponding to a sub-image of the plurality of sub-images;

compute summed costs by aggregating matching costs of pixels in the support window in the plurality of slices corresponding to the plurality of disparity values; and assign, from among the plurality of disparity values, a disparity value corresponding to a minimum summed cost as the disparity value for the sub-image.

12. The apparatus as claimed in claim 11, wherein to reconstruct the first view image, the apparatus is further caused, at least in part to:

select, from the plurality of sub-images, respective patches based on the disparity value associated with respective sub-images of the plurality of sub-images; and concatenate the respective patches associated with the plurality of sub-images to reconstruct the first view image.

13. The apparatus as claimed in claim 12, wherein to compute the second cost volume, the apparatus is further caused, at least in part to select, for the respective patches in the first view image, corresponding patches from the plurality of slices of the first cost volume.

14. The apparatus as claimed in claim 9, wherein to filter the second cost volume, the apparatus is further caused, at least in part to perform cost aggregation on the second cost volume based on tree-based aggregation.

15. The apparatus as claimed in claim 9, wherein the apparatus is further caused, at least in part to:

compare a measure of at least one quality parameter associated with the second reference image with a threshold measure; and perform iteratively, upon determination of the measure of the at least one quality parameter being lower than the threshold measure:

performing cost aggregation on the second cost volume based on the second view image to re-compute the second cost volume, re-compute the second depth map based on the re-computed second cost volume, and reconstruct the second reference image based on the recomputed second depth map.

16. The apparatus as claimed in claim 9, the apparatus is further caused, at least in part to facilitate receipt of the light-field image of a scene.

17. The apparatus as claimed in claim 9, wherein the apparatus comprises a light-field camera configured to capture the light-field image.

18. The apparatus as claimed in claim 9, wherein the apparatus comprises a mobile phone.

19. A computer program product comprising at least one non-transitory computer-readable storage medium, the computer-readable storage medium comprising a set of instructions, which, when executed by one or more processors, cause an apparatus to at least perform:

compute, for a plurality of disparity values, a first cost volume based on a cost matching between plurality of pixels associated with a plurality of sub-images of a light-field image;

compute a first depth map based on the first cost volume, the first depth map comprising a depth information of the plurality of sub-images of the light-field image;

reconstruct a first view image associated with the light-field image based on the depth information of the plurality of sub-images, the first view image comprising reconstruction information associated with the plurality of pixels;

compute a second cost volume corresponding to the first cost volume based on the reconstruction information of the first view image;

filter the second cost volume based on the first view image to generate an aggregated cost volume; and generate a second depth map based on the aggregated cost volume, the second depth map configured to facilitate in generation of a second view image, wherein resolution of the second view image is higher than a resolution of the first view image.

20. The computer program product as claimed in claim 19, wherein to perform cost matching between the plurality of pixels associated with the plurality of sub-images, the apparatus is further caused to:

compute, for a pixel of the plurality of pixels in a current sub-image, an absolute difference between pixel value of the pixel in the current sub-image and pixel value of a corresponding pixel in a neighboring sub-image; and generate, for a disparity value of the plurality of disparity values, a slice of a plurality of slices of the first cost volume based on the cost matching.

* * * * *